E. T. P. GOODYEAR.
FACIAL PAD ADAPTED FOR USE WITH FIELD GLASSES AND OTHER OPTICAL INSTRUMENTS
AND MEANS FOR SUPPORTING THE SAME ALONE OR WITH OTHER INSTRUMENTS
OR APPLIANCES ON THE HEAD OF THE OBSERVER.
APPLICATION FILED MAR. 25, 1919.
1,356,708.
Patented Oct. 26, 1920.
4 SHEETS—SHEET 1.
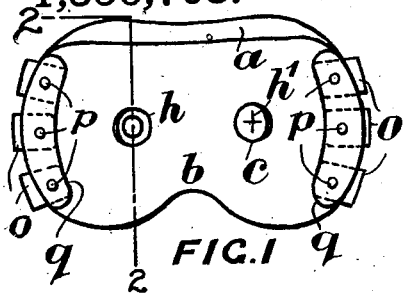
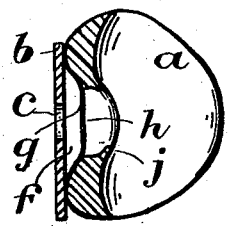
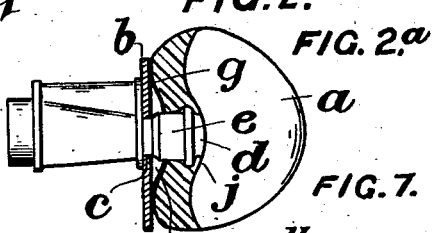
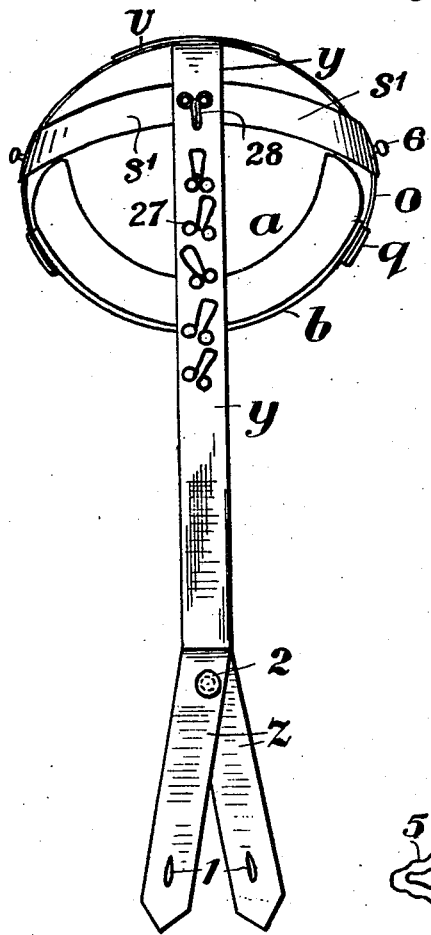
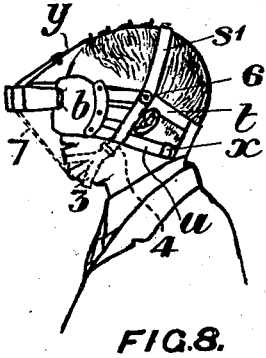
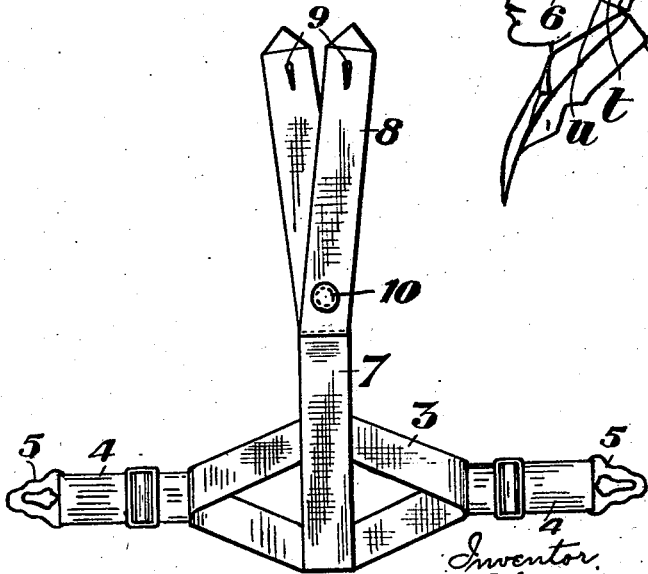
Inventor.
Edward T. P. Goodyear.
By Henry M. [signature]
Atty E. T. P. GOODYEAR.
FACIAL PAD ADAPTED FOR USE WITH FIELD GLASSES AND OTHER OPTICAL INSTRUMENTS
AND MEANS FOR SUPPORTING THE SAME ALONE OR WITH OTHER INSTRUMENTS
OR APPLIANCES ON THE HEAD OF THE OBSERVER.
APPLICATION FILED MAR. 25, 1919.
1,356,708.
Patented Oct. 26, 1920.
4 SHEETS—SHEET 2.
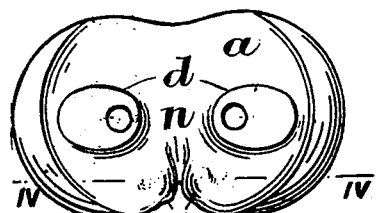
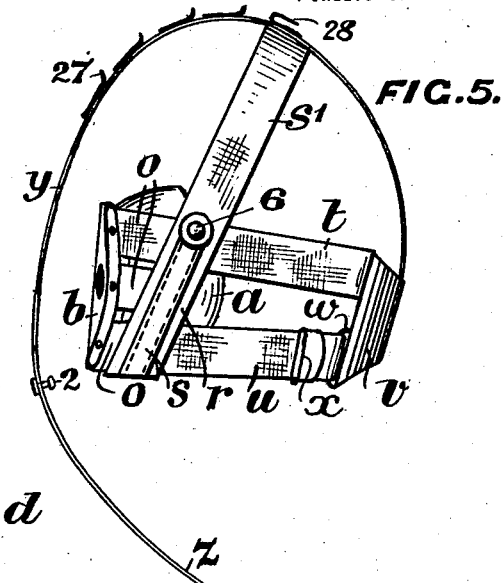
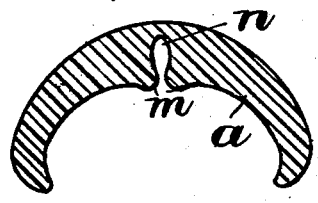
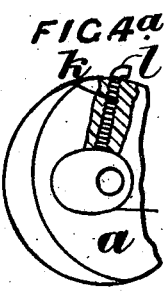
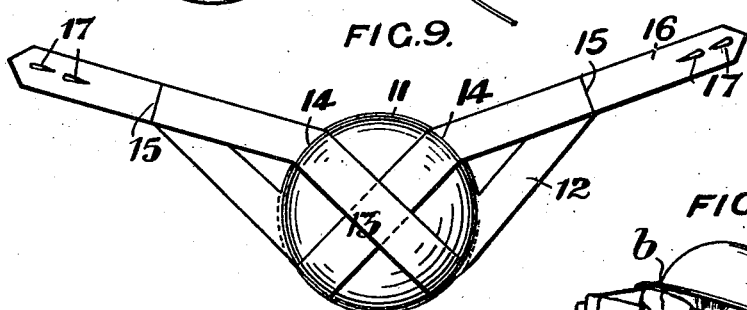
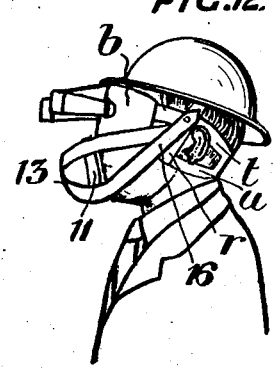
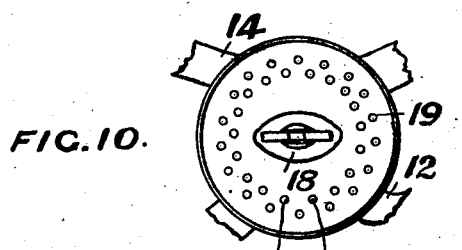
Inventor
Edward T. P. Goodyear
By
Atty E. T. P. GOODYEAR.
FACIAL PAD ADAPTED FOR USE WITH FIELD GLASSES AND OTHER OPTICAL INSTRUMENTS
AND MEANS FOR SUPPORTING THE SAME ALONE OR WITH OTHER INSTRUMENTS
OR APPLIANCES ON THE HEAD OF THE OBSERVER.
APPLICATION FILED MAR. 25, 1919.
1,356,708. Patented Oct. 26, 1920.
4 SHEETS—SHEET 3.
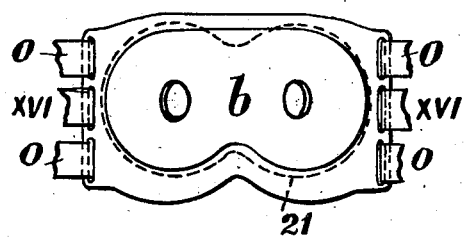
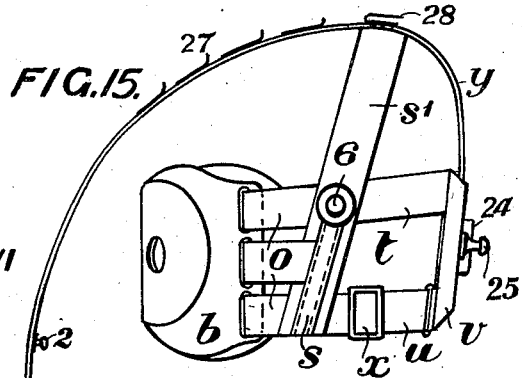
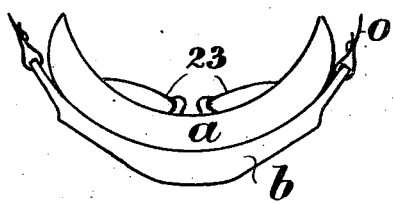
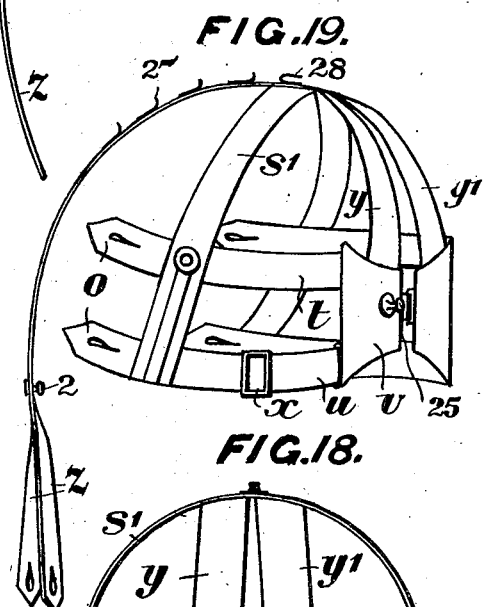
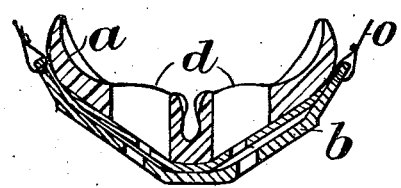
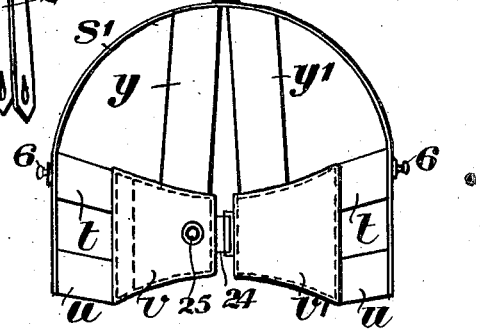
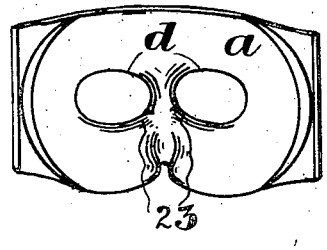
Inventor
Edward T. P. Goodyear
By Henry Orth
Atty.

E. T. P. GOODYEAR.
FACIAL PAD ADAPTED FOR USE WITH FIELD GLASSES AND OTHER OPTICAL INSTRUMENTS AND MEANS FOR SUPPORTING THE SAME ALONE OR WITH OTHER INSTRUMENTS OR APPLIANCES ON THE HEAD OF THE OBSERVER.
APPLICATION FILED MAR. 25, 1919.
1,356,708.
Patented Oct. 26, 1920.
4 SHEETS—SHEET 4.
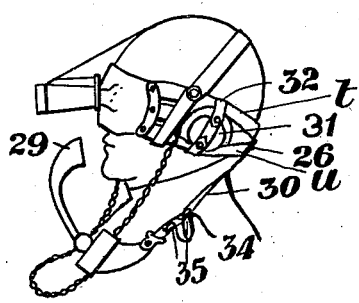
FIG. 20.
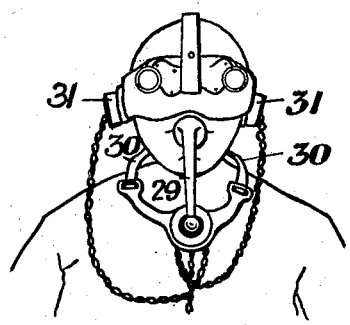
FIG. 21.
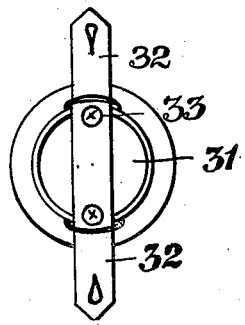
FIG. 22.
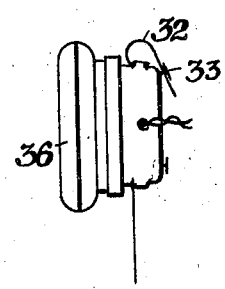
FIG. 23.
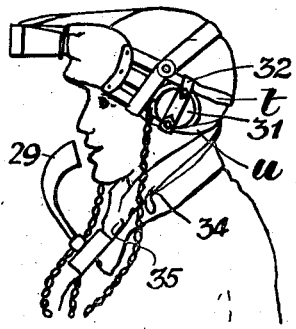
FIG. 24.
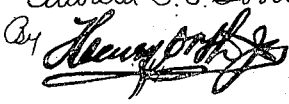

UNITED STATES PATENT OFFICE.

EDWARD THOMAS PARSONS GOODYEAR, OF REIGATE HEATH, ENGLAND.

FACIAL PAD ADAPTED FOR USE WITH FIELD-GLASSES AND OTHER OPTICAL INSTRUMENTS AND MEANS FOR SUPPORTING THE SAME ALONE OR WITH OTHER INSTRUMENTS OR APPLIANCES ON THE HEAD OF THE OBSERVER.

1,356,708.                 Specification of Letters Patent.     Patented Oct. 26, 1920.

Application filed March 25, 1919. Serial No. 285,048.

*To all whom it may concern:*

Be it known that I, EDWARD THOMAS PARSONS GOODYEAR, subject of the King of Great Britain, residing at Colley Corner, Reigate Heath, in the county of Surrey, England, have invented a certain new or improved facial pad adapted for use with field-glasses and other optical instruments and means for supporting the same alone or with other instruments or appliances on the head of the observer, of which the following is a specification.

This invention relates to improvements in facial pads for use with field glasses or the like and means for supporting the same alone or with other instruments or appliances on the head of the observer. Or the facial pad may be mounted on gunsights, rangefinders and other optical instruments.

The object of the invention is to provide a support which is adaptable for use in a variety of different ways. On board ship it is very advantageous to have a flexible facial pad for field glasses, such as this invention provides, whereby during heavy firing or on other occasions when there is heavy concussion, the observer's face is protected against injury by such glasses while in use. It is further advantageous if the support be adapted to protect the eyes of the observer against poisonous or irritating gases. For use at observation posts, on balloons, on aeroplanes, and other aircraft, or where space is restricted or the hands must be used to hold on, it is advantageous if the said support can be harnessed to the head and adapted to hold the field glasses in the correct position for observation, in spite of wind pressure and other forces tending to displace such glasses, without the observer having to use his hands for steadying such glasses, the hands being thereby left free for controlling and other operations. The invention seeks to provide a support capable of fulfilling all these requirements and of being adaptable, if necessary, for the support of other instruments upon the head, such as telephone and respiratory instruments.

According to this invention the support comprises an elastic, flexible, resilient or yielding facial pad device molded to fit the features of the upper portion of the head or face and nose and formed with an eyepiece opening or openings adapted for receiving and holding, gripping or engaging with the eyepiece end or ends of the field glasses or other optical instrument. The pad is preferably provided in front with an elastic diaphragm or diaphragms perforated to receive and elastically hold the eye piece ends of the optical instrument. The pad is moreover furnished with a system of straps or harness to hold it on the head of the observer for use with field glasses and the like and this and other minor improvements will be hereinafter particularly described and set out in the claims.

In order to enable the invention to be readily understood, reference is made to the accompanying drawings in which:—

Figure 1 is a front elevation of a pad constructed according to this invention.

Fig. 2 is a vertical section on the line II—II of Fig. 1.

Fig. 2ª is a view similar to Fig. 2, but showing an eye-piece inserted into the pad or support.

Fig. 3 is a rear elevation of the support molded with nose clip projections.

Fig. 4 is a horizontal section on the line IV—IV of Fig. 3.

Fig. 4ª is a fragmentary view of a pad fitted with a ventilating device.

Fig. 5 is a side elevation of a support such as is seen in Figs. 1 to 4, having a bridle or head harness secured thereto.

Fig. 6 is a plan of Fig. 5.

Fig. 7 is a view, to a smaller scale, showing the support harnessed to the head of the wearer and in position for observing through the binoculars.

Fig. 7ª is a view similar to Fig. 7 showing the support pushed up, without disturbing the holding of the bridle, so that the wearer may look around with the naked eye.

Fig. 8 is a plan of a chin cradle with straps for attachment, the fitting of this device being indicated by dotted lines in Fig. 7.

Fig. 9 is a front elevation of a respirator or filter with suspensory straps for supporting the same from the bridle.

Fig. 10 is a rear elevation of the filter seen in Fig. 9 with a wire nose clip suspended therefrom.

Fig. 11 is a side elevation of an existing nose clip which may be used with this invention.

Fig. 12 is a view to a smaller scale showing binoculars in the support on the wearer's head and the respirator or filter suspended from the bridle.

Fig. 13 is a view similar to Fig. 1 of a modification and Fig. 14 is a plan of the same.

Fig. 15 is a side elevation of Fig. 13 with a modified form of bridle attached thereto.

Fig. 16 is a horizontal section on the line XVI—XVI of Fig. 13.

Fig. 17 is a rear elevation of Fig. 13.

Fig. 18 is a rear elevation of the bridle seen in Fig. 15.

Fig. 19 is a side elevation of a bridle removed from the support and formed with buttonholes for attachment to a support.

Fig. 20 is a side view showing a support and bridle carrying binoculars and telephone instrument on the head of the wearer.

Fig. 21 is a front view of Fig. 20.

Fig. 22 is an elevation of a telephone receiver fitted with means for attaching it to the bridle.

Fig. 23 is a view from one side of Fig. 22 showing one of the attaching straps in the fastened position and Fig. 24 is similar to Fig. 20 but showing the binoculars raised or pushed up clear of the eyes of the wearer, the telephone receiver remaining in position over the person's ear.

In the construction seen in Figs. 1, 2 and 2$^a$, the support comprises a pad $a$ of spongy rubber or the like molded to fit against the upper part of the face, that is to say, just above the bridge of the nose and over the eye sockets of the wearer. The front of this pad is advantageously stiffened by the attachment thereto of a layer diaphragm or band $b$ of stiff or vulcanized rubber. The band $b$ and pad $a$ are formed with apertures $c$ and $d$ respectively to allow of the insertion of the eye-piece ends $e$ of the binoculars as seen in Fig. 2$^a$. In order to give an additional grip upon and support for the eye-pieces a cavity $f$ may be formed behind each aperture $c$ and within such cavities there may be diaphragms $g$ of rubber or the like formed with apertures $h$ which may be circular, or of other suitable shape, or in place of such apertures the said diaphragms may be formed with slits or cross slots as indicated in Fig. 1. Consequently, the diaphragms $b$, $g$, are a little distance apart, and as shown in Fig. 2, the tube of the binoculars is connected to the pad in two places, one being quite close to the eye of the observer and the other farther away, as will be apparent from Fig. 2$^a$. Around the apertures in the pad, suitable projections $j$ may be molded which bear against the eye sockets of the wearer and prevent injury thereto in the event of shock or concussion. Such projections, moreover, increase the air-tightness of the pad against the eye sockets and thereby prevent the access of gas irritants to the eyes of the observer.

The pad support so far described, when applied to binoculars as seen in Fig. 2$^a$, is useful, for example, on board ship. The binoculars may be suspended on the body by means of a strap as usual, and when taken in the hand and applied to the eyes, the binoculars are held with the pad against the upper part of the face and the pad protects the eyes of the observer against wind, spray, rain, extraneous light, gun flashes, and other undesirable influences.

To prevent the formation of dew upon the lenses, corrugated ventilation tubes $k$ Fig. 4$^a$ may be embedded in the pad and communicate between the apertures $d$ and the air. These tubes $k$ may be fitted with small cowl devices or may have bent over ends $l$ to prevent ingress of moisture into the tubes and also to have an inductive effect as will be readily understood. Or the outer ends of the tubes, or plain holes, may be flush with the surface of pad and furnished with gauze or the like, if desired.

On the inner surface of the pad there may be molded or fitted protuberances $m$, one on either side of a gap $n$ for the bridge of the nose, as shown in Figs. 3 and 4. Owing to the elasticity of the material, these protuberances press against the sides of the nostrils and prevent inhalation through the nose. With such a construction, a respirator or air filter may be worn as will be described with reference to Figs. 9 to 12.

For enabling binoculars to be supported without the use of the hands, as is very desirable upon aircraft, a bridle or harness is attached to the support by any suitable means of attachment. Fig. 1 shows three bridle straps $o$ on each side attached by means of rivets $p$ and plates $q$ to the ends of the front band $b$. The construction of the bridle, according to one suitable arrangement, is illustrated in Figs. 5 and 6. The three straps $o$ on each side are connected to side straps $r$ preferably inclined from the vertical and provided with stiffeners $s$. These side straps $r$ may extend transversely over the crown of the head as indicated at $s'$. Upper and lower side straps $t$, $u$, connect between the inclined side straps $r$ and a pad or band $v$ of fabric or other suitable material, which comes at the back of the head. This pad $v$ may be formed in one piece or it may be divided into two parts $v$ and $v'$ which are suitably hooked together, as shown in Fig. 18. Either or both of these straps $t$ and $u$ may be connected to the pad $v$ by means of a loop $w$ secured to the latter and may be adjustable as to length by means of the well known sliding clips indicated at $x$, Fig. 5, so that the bridle can be suited to heads of different dimensions. From the middle of the pad $v$ a crown strap $y$ extends upwardly over the middle of the head, being connected intermediately to the transverse crown strap $s'$ and extending forwardly to the front of the face where it is bifurcated or formed with two tabs $z$. Near the ends of the tabs $z$ are formed buttonholes 1, and at their junction there is provided a stud or button 2. The bridle being applied to the head so that the pad $v$ comes at the back of the head or nape of the neck, with the straps $t$ above, and the straps $u$ below the ears as seen in Fig. 7, the transverse crown strap $s'$ should fit nicely on the crown of the head if the support $a$ is in position on the bridge of the nose and over the eye sockets of the wearer. If the binoculars are in the support the strap $y$ is brought forward, the tabs $z$ are bent around the front bar or hinge members of the binoculars and are buttoned, by means of the holes 1, on to the stud or button 2, so that the outer ends of the binoculars are suspended and supported, or obviously, the strap $y$ may have a hook or hooks to engage the binoculars.

If it be desired to observe with the naked eye, the pad support and binoculars may be pushed upward on to the forehead, as seen in Fig. 7ª, without disturbing appreciably the fit of the bridle, a sort of pivotal motion taking place from a point at the back of the head as will be readily understood.

On an aeroplane, ship or other vehicle, in which pitching or violent motion may be experienced, it is advantageous to provide means for preventing the binoculars from being tossed upward. Such means may consist of a chin cradle illustrated in Fig. 8, the actual fitting of this cradle being indicated by dotted lines in Fig. 7. This cradle comprises cradle straps 3, adjustable suspensory straps 4, fitted with eyes or buttonholes, or other suitable fastening devices 5, adapted for attachment to studs 6 (as also seen in Fig. 5) fitted at the upper ends of the stiffeners $s$. From the center of the cradle there extends a strap 7, having bifurcated ends or tabs 8, formed with buttonholes 9, or other fastening means adapted for connection with a stud, button or other fastener 10. These ends or tabs 8 are secured to the front bar or hinge members of the binoculars in the same manner as the tabs $z$ as will be readily understood from Fig. 7.

A respirator or air filter may be suspended from the bridle by means of the straps illustrated in Figs. 9 and 10. These comprise a circular strap 11, embracing the casing of the filter and straps 12 crossing one another and joined together in the middle at 13, fastened to the ring strap at 14 and having their ends connected together at 15, tabs 16 being sewn to these ends. The tabs are formed with buttonholes 17, so that they may be buttoned to the studs or buttons 6, Fig. 5, the respirator being then supported on the mouth as shown in Fig. 12. The respirator may be of a well known pattern having a mouthpiece 18, and air inlet holes 19, as seen in Fig. 10, and a spring wire nose clip 20 may be suspended from the respirator as shown. This wire clip is not needed if the pad support is formed with the protuberances $m$, Figs. 3 and 4.

It may here be observed that the side strap $r$ and stiffener $s$ act as spacers to keep the straps $t$ and $u$ at the correct distance apart for the ear of the wearer to protrude through, as seen in Fig. 12. Thus, telephone ear pieces may be readily applied to the ear of the wearer as will be hereinafter described.

Referring now to Figs. 13 to 17, it will be seen that the straps $o$ may be connected, detachably if preferred, in slots formed in the ends of the front rubber band or diaphragm $b$. Also, if desired, wire reinforcement 21 shown in dotted lines Fig. 13 may be embedded in the pad $a$ in order to stiffen, strengthen or preserve the shape of such pad. Parts seen in these figures which are similar to parts seen in Figs. 1 to 8 are indicated by the same reference letters or numerals. As seen in Figs. 14 and 17, projections 23, which are somewhat pronounced, may be molded around the apertures $d$, to bear against the rims of the eye sockets. In all cases the parts are so dimensioned that when the support is in position over the eyes, the lenses are at about the correct distance from the eyes so that the instrument is constantly in focus and there is no strain such as would be imposed upon the eye if unconscious refocusing were constantly necessary as when holding the binoculars to the eyes without the pad or support.

In a modified form of bridle seen in Figs. 15 and 18, the rear pad or band may be in one piece but, preferably, is divided into two portions $v$, $v'$, adapted to be connected together by means of a loop 24, and button or stud 25, or by any other suitable fastening. That portion of the crown strap $y$ making connection between the pad $v$ and the transverse crown strap $s'$ is conveniently duplicated, the two straps being indicated by the letters $y$ and $y'$ in Fig. 18. The advantage of this modification is that by simply disconnecting the devices 24, 25, the whole bridle and support can be easily and quickly removed from the head, as will be readily apparent.

In the construction seen in Fig. 19, there are only two tabs or straps $o$ on each side and these may be formed with buttonholes so that they may be simply buttoned on to studs or buttons on the pad support. With this mode of connection it may be unnecessary to divide the rear pad v, as the tabs o on one side can be so readily disconnected from the pad support. One or more buttons or studs 25 may be fitted on the pad v for the suspension therefrom of a telephone transmitter or other instrument. In Fig. 18, the stud 25, may also be used for this purpose.

In any of the constructions, the crown strap y may be adjusted as to length in a very simple manner by attaching a series of eyes 27, thereto, any one of which may be engaged with a hook 28, as will be readily understood from Figs. 5 and 15.

In Figs. 20 and 21 a telephone mouthpiece or transmitter 29 is shown suspended around the neck by means of straps 30 fastened to the stud 26 or to the stud 25 Fig. 18. If desired, the strap 30 may have a hook 34 and eyes 35 to shorten the length of the strap and reduce the distance of the transmitter from the mouth of the wearer. The telephone receivers or ear pieces may be supported by fitting over their outer portions rubber or other cups 31 fitted with tabs or straps 32. If desired such cups 31 may be formed or combined with the known ear cushions 36. The receivers are placed against the ear, the upper tab 32 is inserted inside of and bent over the strap t while the lower tab is inserted inside of and bent over the lower strap u, the buttonholes of the respective tabs being then buttoned on to studs or buttons 33 all as will be readily understood from Figs. 20, 22 and 23. The cups 31 are adapted to be slid backward or forward on the straps t and u to suit the position of the ears of the wearer. The receivers may be used together or singly and without the transmitter.

The ventilating arrangement hereinbefore described may, if desired, comprise inlet openings or tubes for the admission of fresh air in addition to the vent tubes described.

The straps employed for the bridle or harness may be made of elastic material instead of, or in addition to, being made adjustable as to length by the devices indicated.

The pad at the back of the head is not essential, as the side straps t and u may simply cross and be joined at the back as will be readily understood.

The reinforcement of the pad support may be accomplished in any suitable manner as for example by a wire frame or ring of malleable metal, such as copper or aluminium, sewn or otherwise fastened all around the pad support.

The supports for the telephone receivers may also be varied and may, for example, consist of skeleton cups formed of webbing and the fastening means for any of such cups may take the form of clips, loops or the like, instead of the tabs above described.

I claim:

1. A support for field glasses and other optical instruments designed for general use, comprising a facial pad of resilient nature molded to closely fit the features of the upper portion of the face and nose and formed with an opening adapted to receive and grip the eye piece end of the optical instrument, substantially as set forth.

2. A support for optical instruments designed for general use, comprising a facial pad of resilient nature molded to closely fit against the brow and nose and around the eye sockets of an observer, cavities in the said pad opposite to the eyes of the observer and openings therefrom into the front of the pad formed to receive and grip the eye piece ends of the optical instrument, substantially as set forth.

3. A support for optical instruments designed for general use, comprising a facial pad of resilient nature molded to fit against the brow, nose and cheeks around the eye sockets of an observer, said pad having cavities covered by a relatively stiff band applied to the front of said pad, said pad and band being provided with openings in the region of said cavities and adapted to grip the eye piece ends of the optical instrument, substantially as set forth.

4. A support for optical instruments designed for general use, comprising a facial pad of resilient nature molded to fit the features of the upper portion of the face and nose of an observer, cavities in the said pad opposite to the eyes and openings therefrom into the front of said pad adapted to receive and grip the eye piece ends of the optical instrument, and means for securing the pad to the head of the observer, substantially as set forth.

5. A support for optical instruments designed for general use, comprising a facial pad of resilient nature molded to fit the features of the upper portion of the face and nose of an observer and formed with cavities having openings adapted to receive and grip the eye piece ends of the optical instrument, and ventilation ducts through the walls of the pad for establishing communication between the cavities and the atmosphere, substantially as set forth.

6. A detachable support for optical instruments designed for general use, comprising a facial pad of resilient nature molded to fit the features of the face and nose, a reinforcement for said pad consisting of flexible wire, cavities in said pad opposite to the eyes and openings therefrom into the front of the pad adapted to receive and grip the eye piece ends of the optical instrument, and means for securing the pad to the head of the observer, substantially as set forth.

7. A resilient facial pad device for supporting an optical instrument comprising a facial pad molded to fit the features of the upper portion of the face of an observer, cavities in the said pad opposite to the eyes, a recess to receive the nose, openings in the cavities to receive the eye piece ends of the optical instrument, harness for securing the pad to the head of the observer, means attached at one end to the harness on top of the head and at the other end to the optical instrument remote from the eye piece ends for supporting the outer end of said instrument and means for attaching telephone instruments and the like to the said harness.

8. A resilient facial pad device for supporting an optical instrument comprising a facial pad molded to fit the features of the upper portion of the face of an observer, cavities in the said pad opposite to the eyes, a recess to receive the nose, openings in the cavities to receive the eye piece ends of the optical instrument, a plurality of elastic diaphragms spaced apart in front of the said pad to elastically grip the eye piece ends of the instrument, a head piece consisting of side straps connected to the ends of the said pad and passing around to the back of the head, means for maintaining these straps apart in the neighborhood of the ears, means for connecting the free ends of the said straps, a transverse strap adapted to pass over the head and connected at each end to the side straps and a crown strap connected at one end to one of the side straps behind the head, intermediate of its ends to the transverse strap and means at its free end for connection to the optical instrument remote from the eye piece end.

9. An elastic facial pad for supporting an optical instrument, molded to fit against the brow, nose and cheeks around the eye sockets of an observer, cavities in the said pad opposite to the eyes of the observer, openings in the said cavities and a diaphragm, in front of the said openings, with apertures registering therewith to receive and elastically hold the eye piece ends of the optical instrument substantially as set forth.

10. An elastic facial pad, for supporting an optical instrument, molded to fit against the brow, nose and cheeks around the eye sockets of an observer, cavities in the said pad opposite to the eyes of the observer, openings in the said cavities, a diaphragm of elastic material, in front of the said openings and having apertures registering therewith and a second perforated diaphragm of elastic material in front of and separated from the first diaphragm by a small space, the apertures in the two diaphragms being adapted to receive and hold the eye piece ends of the optical instrument, substantially as set forth.

11. An elastic facial pad, for supporting an optical instrument molded to fit against the brow, nose and cheeks around the eye sockets of an observer, cavities in the said pad opposite to the eyes of the observer, openings in the said cavities to receive the eye piece ends of the optical instrument, means for holding the said eye piece ends in the said cavities and means for fastening the said pad to the observer's head and comprising straps secured to the ends of the pad adapted to pass around the observer's head above his ears and below his ears and means for maintaining the straps at the proper distance apart, substantially as set forth.

12. An elastic facial pad, for supporting an optical instrument, made of elastic material and molded to fit against the brow, nose and cheeks around the eye sockets of an observer, cavities in the said pad opposite to the eye sockets of the observer, apertures in the said cavities to receive the eye piece ends of the optical instrument, means for holding the said eye piece ends in the said cavities, means for fastening the said pad to the observer's head and comprising a system of straps secured to the ends of the pad, adapted to pass around the observer's head, above and below the ears, means for maintaining the said straps apart in the vicinity of the observer's ears and a strap adapted to be passed from the straps at the back of the head, over the crown of the head and to be fastened to a portion of the optical instrument remote from the eye pieces.

13. An elastic facial pad, for supporting an optical instrument, made of elastic material and molded to fit against the brow, nose and cheeks around the eye sockets of an observer, cavities in the said pad opposite to the eye sockets of the observer, apertures in the said cavities to receive the eye piece ends of the optical instrument, means for holding the said eye piece ends in the said cavities, means for fastening the said pad to the observer's head and comprising a system of straps secured to the ends of the pad, adapted to pass around the observer's head; a strap adapted to be secured at one end to the straps at the back of the head, to pass over the crown of the head and to be fastened to a portion of the optical instrument remote from the eye pieces, a chin piece or cradle connected to the said system of straps and a strap connected thereto and to the said portion of the optical instrument remote from the eye pieces substantially as set forth.

14. An elastic facial pad for supporting an optical instrument made of elastic material and molded to fit against the brow, nose and cheeks around the eye sockets of an observer, cavities in the said pad opposite to the eye sockets of the observer, apertures in the said cavities to receive the eye piece ends of the optical instrument, means for holding the said eye piece ends in the said cavities, means for fastening the said pad to the observer's head and comprising a system of straps secured to the ends of the pad, a strap passing transversely over the observer's head and connected to the said straps, a strap adapted to pass over the crown of the head and to be secured at one end to the said straps at the back of the head and to the transverse strap, the other end of the strap being secured to a portion of the optical instrument remote from the eye pieces, a chin piece or cradle connected to the straps passing around the head and a strap connected at one end to the said chin cradle and at the other end to the end of the instrument remote from the eye pieces.

15. An elastic facial pad for supporting an optical instrument made of elastic material and molded to fit against the brow, nose and cheeks around the eye sockets of an observer and a perforated diaphragm to elastically hold the eye piece ends of the optical instrument, of a securing strap connecting each end of the said pad and passing around the head above the ears of the observer, a securing strap connecting each end of the said pad and passing around the head below the ears of the observer, spacing pieces to keep the said straps apart, a crown strap connected at one end to the securing straps at the back of the head and at the other end to the optical instrument at a place remote from the eye pieces and a transverse strap connected at each end to the securing straps in front of the observer's ears and passing over the observer's head from side to side substantially as set forth.

16. A facial pad for supporting an optical instrument comprising in combination a pad made of elastic material and molded to fit against the brow, nose and cheeks and to form cavities opposite the eye sockets of an observer, apertures in the said cavities, a perforated diaphragm mounted on the front of the said pad to elastically hold the eye piece ends of the optical instrument, a second and outer perforated diaphragm or band mounted in front of the first diaphragm so as to leave a space between the two, the apertures in the said diaphragms being in the same axis as those of the apertures in the said pad, and also adapted to receive the eye piece ends of the optical instrument, means on the outer diaphragm for connecting straps thereto, a plurality of securing straps each of which is connected at one end to one end of the said outer diaphragm or band, and adapted to pass respectively over and under one ear of the observer, the other end of each strap being connected to one part of a rear pad made in two parts and adapted to fit against the back of the observer's head, the said pad, a second series of securing straps, each of which is connected at one end to the other end of the said outer diaphragm or band and adapted to pass respectively over and under the other ear of the observer, the other end of each strap being connected to the other part of the pad at the back of the observer's head, means for connecting the two parts of the rear pad together, a pair of crown straps each of which is connected at one end to one part of the rear pad and adapted to pass over the head of the observer toward the front, a transverse strap connected at each end to the straps passing over and under the observer's ears and intermediately to the crown straps and a strap connected at one end to the crown and transverse straps and means at the free end of the said strap for connecting it to the optical instrument remote from the eye pieces, substantially as set forth.

17. A resilient facial pad device for field glasses and other optical instruments comprising a facial pad device molded to fit the features of the upper portion of the face of an observer, cavities in the said pad opposite to the eyes, a recess to receive the nose and fashioned with projections to compress the nostrils, openings in the cavities to receive the eye piece ends of the optical instrument and means for securing the pad to the head of the observer.

18. A resilient facial pad device for field glasses and other optical instruments, comprising a facial pad device, molded to fit the features of the upper portion of the face of an observer, cavities in the said pad opposite to the eyes, a recess to receive the nose and fashioned with projections to compress the nostrils, openings in the cavities to receive the eye piece ends of the optical instrument, a plurality of straps for securing the pad to the head of the observer and means attached to the said straps for supporting a respirator substantially as set forth.

19. A facial pad for supporting an optical instrument comprising in combination a pad of elastic material and molded to fit against the brow and cheeks of the observer, to form cavities opposite the eye sockets and to fit around the nose while compressing the nostrils, apertures in the said cavities, a perforated diaphragm mounted on the front of the said pad to elastically hold the eye piece ends of the optical instrument, a second and outer perforated diaphragm or band mounted in front of the first diaphragm so as to leave a space between the two, the apertures in the said diaphragms being in the same axes as those of the apertures in the said pad and also adapted to receive and hold the eye piece ends of the optical instrument, a plurality of securing straps each of which is connected at one end to one end of the said outer diaphragm or band, and adapted to pass respectively over and under one ear of the observer, the other end of each strap being connected to a rear pad adapted to fit against the back of the observer's head, the said rear pad, a second plurality of securing straps each of which is connected at one end to the other end of the said outer diaphragm or band and adapted to pass respectively over and under the other ear of the observer, the other end of each strap being connected to the said rear pad, a crown strap connected at one end to the rear pad and adapted to pass over the head of the observer toward the front, a transverse strap connected at each end to the straps passing over and under the observer's ears and intermediately to the crown strap, a strap connected at one end to the crown and transverse straps, means at the free end of the said strap for connecting it to the optical instrument remote from the eye pieces, a cradle to support a respirator in proximity to the observer's mouth, and means on each side in the vicinity of the intersection of the crown strap with a securing strap for supporting the said cradle, substantially as set forth.

20. A device for supporting instruments of the character described, comprising a facial pad of resilient nature molded to closely fit the features of the upper portion of the face and nose of an observer, cavities in said pad opposite to the eyes and openings therefrom into the front of the pad adapted to receive and grip the eye piece ends of an optical instrument, harness for securing the pad to the head, comprising straps passing above and below the ears and including means for supporting a telephone instrument in operative position.

21. A resilient facial pad device for field glasses and other optical instruments comprising a facial pad molded to fit the features of the upper portion of the face of an observer, cavities in the said pad opposite to the eyes, a recess to receive the nose, openings in the cavities to receive the eye piece ends of the optical instrument, a perforated diaphragm or band mounted in front of the said band to elastically hold the eye pieces of the optical instrument, harness for securing the pad to the head of the observer and comprising a plurality of securing straps, each of which is connected at one end to the said diaphragm or band, and adapted to pass respectively over and under one ear of the observer, the other ends of each strap being connected to a rear pad adapted to fit against the back of the observer's head, the said rear pad, a second plurality of securing straps, each of which is connected at one end to the other end of the said diaphragm or band and adapted to pass respectively over and under the other ear of the observer, the other end of each strap being connected to the said rear pad, a crown strap connected at one end to the rear pad and adapted to pass over the head of the observer toward the front, a transverse strap connected at each end to the said securing straps passing respectively over and under the observer's ears and intermediately to the crown strap, a strap connected at one end to the crown strap and the transverse strap, means at the free end of the said strap for connecting it to the optical instrument remote from the eye pieces, and a cup for containing a telephone receiver situated over the observer's ear and adjustably connected to an upper and a lower securing strap, substantially as set forth.

22. A resilient facial pad device for field glasses and other optical instruments comprising a facial pad molded to fit the features of the upper portion of the face of an observer, cavities in the said pad opposite to the eyes, a recess to receive the nose, openings in the cavities to receive the eye piece ends of the optical instrument, a perforated diaphragm or band mounted in front of the said band to elastically hold the eye pieces of the optical instrument, harness for securing the pad to the head of the observer and comprising a plurality of securing straps, each of which is connected at one end to the said diaphragm or band, and adapted to pass respectively over and under the ear of the observer, the other end of each strap being connected to a rear pad adapted to fit against the back of the observer's head, the said rear pad, a second plurality of securing straps, each of which is connected at one end to the other end of the said diaphragm or band, and adapted to pass respectively over and under the other ear of the observer, the other end of each strap being connected to the said rear pad, a crown strap connected at one end to the rear pad and adapted to pass over the head of the observer toward the front, a transverse strap connected at each end to the said securing straps passing respectively over and under the observer's ears and intermediately to the crown strap, a strap connected at one end to the crown strap and the transverse strap, means at the free end of the said strap for connecting it to the optical instrument remote from the eye pieces, and means for supporting a telephone transmitter comprising a strap connected at each end to the transmitter and centrally to the rear pad substantially as set forth.

23. A resilient facial pad device for field glasses and other optical instruments, comprising a facial pad molded to fit the features of the upper portion of the face, of an observer, cavities in the said pad opposite to the eyes, a recess to receive the nose, openings in the cavities to receive the eye piece ends of the optical instrument, a perforated diaphragm or band mounted in front of the said band to elastically hold the eye pieces of the optical instrument, harness for securing the pad to the head of the observer and comprising a plurality of securing straps, each of which is connected at one end to the said diaphragm or band, and adapted to pass respectively over and under the ear of the observer, the other end of each strap being connected to a rear pad adapted to fit against the back of the observer's head, the said rear pad, a second plurality of securing straps, each of which is connected at one end to the other end of the said diaphragm or band, and adapted to pass respectively over and under the other ear of the observer, the other end of each strap being connected to the said rear pad, a crown strap connected at one end to the rear pad and adapted to pass over the head of the observer toward the front, a transverse strap connected at each end to the said securing straps, passing respectively over and under the observer's ears and intermediately to the crown strap, a strap connected at one end to the crown strap and the transverse strap, means at the free end of the said strap for connecting it to the optical instrument remote from the eye pieces, a cup for containing a telephone receiver situated over the observer's ear, and adjustably connected to an upper and a lower securing strap and means for supporting a telephone transmitter comprising a strap connected at each end to the transmitter and centrally to the rear pad, substantially as set forth.

EDWARD THOMAS PARSONS GOODYEAR.